(12) United States Patent
Richards et al.

(10) Patent No.: US 8,837,485 B2
(45) Date of Patent: Sep. 16, 2014

(54) ENABLING COMMUNICATION OF NON-IP DEVICE IN AN IP-BASED INFRASTRUCTURE

(75) Inventors: Timothy C. Richards, Cumming, GA (US); Vivek Shankar Srivastav, Suwanee, GA (US)

(73) Assignee: Cisco Technology, Inc., San Joe, CA (US)

( * ) Notice: Subject to any disclaimer, the term of this patent is extended or adjusted under 35 U.S.C. 154(b) by 74 days.

(21) Appl. No.: 13/533,569

(22) Filed: Jun. 26, 2012

(65) Prior Publication Data

US 2013/0343225 A1    Dec. 26, 2013

(51) Int. Cl.
*H04J 3/16*    (2006.01)

(52) U.S. Cl.
USPC .................... 370/392; 370/401; 370/466

(58) Field of Classification Search
USPC ................... 370/392, 400, 401, 466
See application file for complete search history.

(56) References Cited

U.S. PATENT DOCUMENTS

| 2008/0225812 | A1* | 9/2008 | Burgess et al. | 370/338 |
| 2009/0240829 | A1* | 9/2009 | Hildebrand | 709/232 |
| 2009/0319611 | A1* | 12/2009 | Turakhia | 709/204 |
| 2010/0035640 | A1* | 2/2010 | Lew et al. | 455/466 |
| 2010/0071063 | A1 | 3/2010 | Ansari et al. | |
| 2010/0135278 | A1 | 6/2010 | Dingler et al. | |
| 2010/0217837 | A1* | 8/2010 | Ansari et al. | 709/218 |
| 2011/0296011 | A1 | 12/2011 | Dare et al. | |
| 2011/0321062 | A1* | 12/2011 | Pope et al. | 719/318 |
| 2012/0179763 | A1* | 7/2012 | Ferland et al. | 709/206 |
| 2013/0086615 | A1* | 4/2013 | Williams et al. | 725/62 |
| 2013/0210470 | A1* | 8/2013 | Davies et al. | 455/466 |

FOREIGN PATENT DOCUMENTS

WO    WO 2008/08523  A2    7/2008

* cited by examiner

*Primary Examiner* — Andrew Lee
(74) *Attorney, Agent, or Firm* — Tarolli, Sundheim, Covell & Tummino LLP (57) ABSTRACT

An apparatus can include a connection manager adapter that is configured to maintain presence for each of the plurality of non-IP endpoints in an IP messaging and presence protocol based on the endpoint presence data. The endpoint presence data includes a unique identifier and attribute data received for each of a plurality of non-internet protocol (IP) endpoints. The connection manager adapter can be configured to access the endpoint presence data and convert a message between the IP messaging and presence protocol and different protocol for communication with a given non-IP endpoint of the plurality of endpoints.

27 Claims, 5 Drawing Sheets

ENABLING COMMUNICATION OF NON-IP DEVICE IN AN IP-BASED INFRASTRUCTURE

TECHNICAL FIELD

This disclosure relates generally to enabling a non-IP device to participate in an IP-based messaging infrastructure.

BACKGROUND

In various types of network infrastructures, legacy endpoint devices may communicate using fixed non-internet protocol (non-IP) methods. For example, many such endpoint devices may communicate either using a one-way or a two-way radio frequency (RF) protocol, which may include proprietary or standards-based radio frequency (RF) protocols. As an example, a cable headend can include a control system that is configured to communicate control and command information in RF signals with such non-IP enabled endpoints (e.g. set top boxes, CableCARDs, and the like).

DESCRIPTION OF EXAMPLE EMBODIMENTS

Overview

This disclosure relates to enabling a non-IP device to participate in an IP-based messaging infrastructure. In one example, an endpoint connection control apparatus is operative to simulate the presence of a plurality of non-IP endpoints in an IP-based messaging and presence protocol. The apparatus employs presence data acquired for each of the plurality of active endpoints that reside downstream from the apparatus. The apparatus maintains the presence information with the IP messaging and presence protocol to enable communication of messages with the endpoints. The messaging may include one way or two-way messaging depending upon the type or capability of each endpoint. The apparatus can store endpoint presence information for each endpoint, which can also include its type and capability. The apparatus can provide corresponding presence information to the messaging and presence protocol based on the stored endpoint presence information.

The apparatus can also include a translator and logic to map a message from the messaging and presence protocol for delivery to one or more endpoints protocol. This translation can be implemented based on mapping data that is associated with each respective non-IP endpoint. In some examples, the apparatus can be implemented to include a router such that it defines a domain for the apparatus and each of the downstream endpoints. In other examples, the apparatus can reside in a domain of a router that is external to the apparatus.

Example Embodiments

Figure 1:
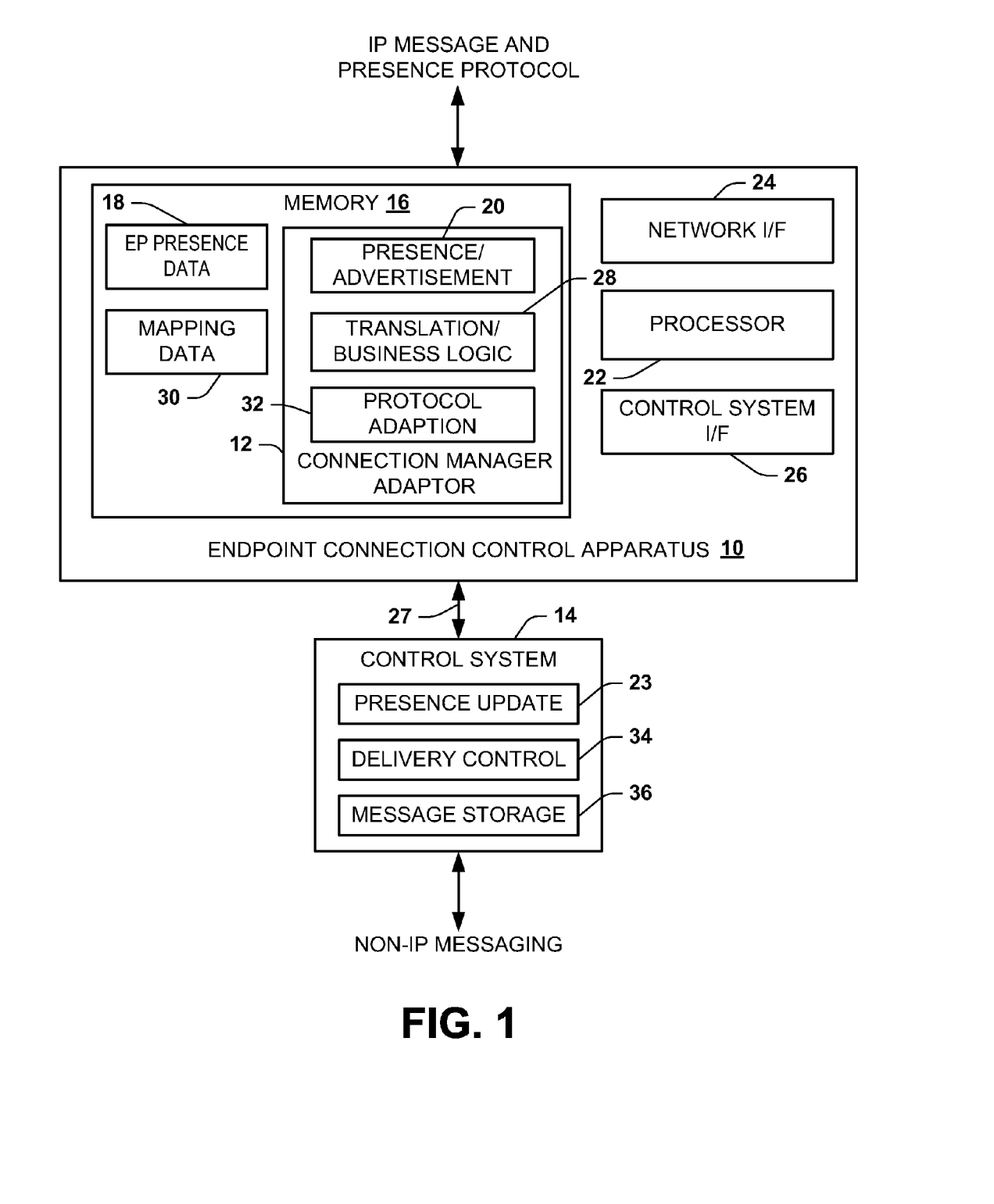
FIG. 1 depicts an example of an endpoint connection control apparatus.

FIG. 1 depicts an example of an endpoint connection control apparatus 10. The apparatus 10 can be implemented in an appliance or computer based machine, which may be a physical or a virtual machine implemented within a context of a network environment. The apparatus 10 is configured to enable one or more non-IP endpoint devices to participate in an IP-based messaging infrastructure referred herein as an IP messaging and presence protocol. Examples of messaging and presence protocols include the extensible messaging and presence protocol (XMPP) such as defined by the internet engineer task force under Worker's Specifications RFC 6120 RFC 6121, RFC 6122, and RFC 3923. Other IP-based message-oriented middleware and protocols can be utilized by the control apparatus 10. As used herein, the IP messaging and presence protocol provides an technology infrastructure that provides for the asynchronous, end-to-end exchange of structured data by means of direct, persistent XML streams among a distributed network of globally addressable, presence-aware clients (e.g., endpoints) and servers.

As used herein, a non-IP endpoint device refers to a device that is not configured to communicate via the IP messaging and presence protocol. Examples of non-IP endpoint devices include set-top boxes, cable cards, other consumer premises equipment or the like device that implement non-IP messaging protocols. These non-IP endpoint devices are sometimes referred to as legacy devices as they do not encompass newer types of endpoints that are IP-enabled and, in particular, enabled for operation in an IP messaging and presence protocol environment. Instead, such non-IP endpoints communicate using legacy protocols, such as RF based communication (e.g., quadrature amplitude modulation (QAM) or quadrature phase-shift keying (QPSK)) that may encode command and control information (e.g., according to ISO/IEC 13818-6). Additionally, in other examples some non-IP endpoints may be IP enabled, but for various reasons (e.g., due to cost of modifying the infrastructure) may still utilize RF based messaging (e.g., for command and control). While such endpoints, corresponding to hybrid endpoints, may be IP enabled, for purposes of this disclosure such hybrid endpoints are considered non-IP endpoints.

In order to enable these and other legacy devices to operate in an IP messaging and presence protocol, the endpoint connection control apparatus 10 includes a connection manager adapter (CMA) 12. The CMA 12 is programmed to simulate and manage the presence for each of a plurality of non-IP endpoints in the IP messaging and presence protocol. Each of the non-IP endpoints and other non-IP devices can appear as a client within the context of the IP messaging and presence protocol. As a result, services and other clients can employ the IP messaging and presence protocol to communicate with each respective non-IP endpoint. Such communication can include messaging addressed directly to a given endpoint or to a group of one or more endpoints. For example, the messaging can be utilized to send command and control information to control operation at each endpoint as well as other forms of messaging that is afforded by the messaging and presence protocol.

The CMA 12 receives input data identifying each of the plurality of downstream endpoints as well as their capabilities and features thereof. This input data can be provided by a control system 14 and stored in memory 16 of the control apparatus 10. The memory 16 can store data and machine readable instructions that can be executed by a processor 22 for performing functions and methods corresponding to the CMA 12 as well as other functions of the control apparatus 10.

In the example of FIG. 1, the memory 16 can store endpoint presence data 18 for each of the plurality of non-IP endpoints that resides downstream from the apparatus 10. The endpoint presence data 18 can be stored based on input data provided by the control system 14. For example, the control system 14 can include a presence update component 23 that is programmed to send an update message to the endpoint connection control apparatus 10 specifying which endpoints are active in the IP messaging and presence protocol as well as attributes of the respective non-IP endpoints. The control system 14 can identify each of the endpoints with a unique identifier. For example, the presence update component 23 of the control system 14 can provide the unique identifier for each non-IP endpoint corresponding to a media access control (MAC) address of each respective endpoint device. Other unique identifiers can be utilized, such as a serial number for the endpoint device, an IP address that has been assigned to the endpoint or a unique identifier generated for the endpoint. The attributes stored as part of the presence data 18, for example, can define the capabilities of each endpoint such as whether a given endpoint is capable of one-way or two-way communications. The attributes of the endpoints can vary depending on the type of device (e.g., different models of set-top boxes can have different capabilities).

As disclosed herein, the control system 14 can reside downstream and communicate such information with the control apparatus 10 via an IP or non-IP messaging protocol that is different from the IP messaging and presence protocol. In other examples, the downstream control system 14 can be configured to communicate via the IP messaging and presence protocol.

As a further example, the control system 14 can provide such information for each of the endpoints when the control apparatus 10 is initialized and integrated into the apparatus 10. During normal operation, the control system 14 can also provide updated endpoint information to the control apparatus 10 for a given endpoint, such as in response to the addition or removal of the given non-IP endpoint. Additionally, status detection may also be possible through a reverse RF path for non-IP endpoints capable of two-way communication, for example. This two-way communication can aid the presence status notification. In response to receiving the endpoint information, the CMA 12 can generate and store the EP presence data 18 in the memory 16.

The CMA 12 can include a presence and advertisement function 20 that is programmed to advertise presence information for each of the endpoints based on the endpoint presence data 18. The presence information can include a presence identifier that uniquely identifies each respective endpoint in the messaging and presence protocol. The presence information further can include attribute data for each of the plurality of non-IP endpoints that specifies capabilities for each of the plurality of endpoints. For the example where the IP messaging and presence protocol is XMPP, the CMA 12 can signal the presence of endpoints by means of a dedicated communication primitive: the <presence/>stanza. A service operating in a network or cloud infrastructure that implements the messaging and presence protocol thus can employ the presence information for managing communications for the endpoints. Since the CMA 12 manages the presence for each of the non-IP endpoints, each endpoint can be deemed present and capable of participating in the IP messaging and presence protocol. Thus, other clients and services configured to communicate in the messaging and presence protocol can send messages to each of the non-IP endpoints.

For an example where the messaging and presence protocol comprises the XMPP service, each endpoint, including each non-IP endpoint, is assigned a presence identifier (e.g., referred to as a Jabber ID (JID)). The JID may be a combination of unique user ID, routing domain and sign-in resources. A proposed JID construct for each non-IP endpoint in XMPP, for example, will enable message routing on the XMPP messaging infrastructure for a non-IP endpoint on a distributed and scalable messaging network. An example of a JID construct that can be employed for each of the non-IP endpoints can be as follows.

EP_ID@domain/EC_ID where the EP_ID is a unique identifier, such as an address or the like, for the endpoint—examples include a MAC address, serial number or IP address assigned to the endpoint;

the domain is the XMPP domain in which the endpoint resides; and

EC_ID is a unique resource identifier for the control system 14 to which the endpoint is communicatively coupled.

The example JID construct can be generated by the CMA 12 based on input data from the control system 14. Alternatively, the control system 14 can be programmed to generate the JID construct for each endpoint and provide such information to the CMA 12. By implementing the JID construct consistent with the above example, messages can be routed efficiently without explicit look up to memory and to facilitate delivery of the messages from the IP messaging presence and protocol to non-IP endpoints. For instance, the message can be routed efficiently via the control system 14, which is uniquely identified using the EC_ID construct in the JID, to the specified non-IP endpoint.

By way of example, the processor 22 can execute the advertisement function 20 periodically to maintain the presence information for the IP messaging and presence protocol for active endpoints based on the EP presence data 18. The processor 22 can submit the presence information to the messaging and protocol registrar via a corresponding network interface 24. For instance, the network interface 24 can be implemented as a network interface controller that is configured to connect the apparatus 10 to a computer network such as a wide area network (e.g., the Internet) or a local area network (e.g., intranet) on which the IP messaging and presence protocol service resides. Thus, as new non-IP endpoints are added or removed from the downstream network below the control apparatus 10, the advertisement function 20 can in turn update the presence information in an IP messaging and presence protocol registrar in response to the updates to the endpoint presence data 18 in the memory 16.

The endpoint connection control apparatus 10 can also include a control system interface 26 that is configured to connect the control apparatus to the control system 14 and a corresponding network supported by the control system. The control system interface 26 can be hardware and/or software configured to provide for communication with the control system 14. For example, the control system interface 26 can employ an IP network communication protocol for communication with the control system 14, such as transmission control protocol over IP (TCP/IP) over an Ethernet or other type of network, schematically indicated at 27.

As disclosed herein, the endpoint connection control apparatus 10 can service any number of one or more control systems 14. A corresponding control system interface 26 thus can be included to provide for communication with each such control system 14. Each control system interface 26 can be implemented as its own hardware device or a common device can be utilized and configured to provide for communication with each of plural control systems.

The endpoint connection control apparatus 10 can also include a translation/business logic function 28. The translation/business logic function 28 can be implemented as machine executable instructions stored in the memory 16 such as can be executed by the processor 22. The translation/business logic function 28 can be configured to process a message received via the IP messaging and presence protocol and prepare the relevant content in the message for delivery to a given non-IP endpoint. For example, the translation/business logic function 28 can identify in which control system a destination non-IP endpoint resides based on the resource identifier (e.g., the EC_ID in the JID construct) in the message. Since the resource ID is in the message, as part of the JID construct, the translation/business logic function 28 can control routing of the message directly from the resource identifier in the message without explicit look up in memory. The translation/business logic function 28 can then re-format the message for delivery to the endpoint through the control system 14. The translation/business logic function 28 can perform the conversion of messages based on mapping data 30 that is stored in the memory 16. Alternatively, the translation/business logic function 28 can generate instructions identifying communication parameters to implement the delivery to the endpoint via the control system 14 based on the presence identifier and mapping data 30.

The CMA 12 can also include a protocol adaption function 32 to convert the message to given protocol for communication to the control system 14 based on the converted message and instructions from the translation/business logic function 28. For instance, the translation/business logic function 28 can provide a converted message (e.g., according to an XML schema) that specifies the destination endpoint (e.g., MAC address) and control system (e.g., unique controller ID of the control system) and other instructions (e.g., command) and protocol requirements. The protocol adaption function 32 can thus be programmed to repackage the message from the IP messaging and presence protocol for sending to a given non-IP endpoint according to protocol requirements of the control system 14 (e.g., an application layer protocol that is implemented by the control system).

As an example, the protocol adaption function 32 can be configured to repackage the message according to the Business and Operations Support System (BOSS) interface, which was developed by Scientific-Atlanta, Inc. The protocol adaption function 32 can adapt the message for communication according to other application layer interfaces. The protocol adaption function 32 can also be utilized for adapting communication transaction requests and responses between the control system and the IP messaging and presence layer depending on the operating requirements of the control system 14. Additionally, the protocol adaption function 32 can be configured to implement multiple protocols such as to support a plurality of different types of control systems 14. For example, a given endpoint connection control apparatus 10 can be configured to support a digital access controller, a digital network control system (e.g., from Cisco Systems, Inc.) as well as control systems from other manufacturers.

The translation/business logic function 28 can also manage entitlements of each endpoint based on the mapping data 30. For example, the translation/business logic function 28 can update billing or other services in the cloud by sending messages to such services via the messaging and presence protocol. The update message can originate at a given non-IP endpoint or at the control system 14, for example in response to a user or operator input requesting a change in entitlements. The translation/business logic function 28 can thus convert a message to a format for sending it to a corresponding service via the messaging and presence protocol (e.g., by specifying the service's JID construct) based on the message received from the control system 14.

The translation/business logic function 28 can also be programmed convert a device level entitlement into account level entitlement for forwarding the messages to the entitlement-service in the cloud infrastructure. For instance, a transaction message from a given non-IP endpoint, corresponding to a request for a change in entitlements (e.g., a device-based request), can be sent to the endpoint connection control apparatus 10. The translation/business logic function 28 can use the non-IP endpoint identifier in the request message as an index to perform an account look-up and determine account information associated with the non-IP endpoint. The translation/business logic function 28 can employ the account information to convert the device-based transaction message to an account-based transaction message that is submitted to the cloud infrastructure via the IP messaging and presence protocol. In other examples, the CMA 12 can send the original device level transaction message to an appropriate service in the cloud infrastructure based on the mapping data 30, which service can convert the transaction from the device domain to the account level domain. In either case, after the request has been processed, a corresponding entitlement message can be sent via the IP messaging and presence protocol layer to both non-IP and IP endpoints associated with the corresponding account.

The translation/business logic function 28 can also provide necessary responses (e.g., acknowledgements or the like) via the IP messaging and presence protocol on behalf of the non-IP endpoints in response to messages received for a given endpoint. The type of response can vary based on the mapping data 30, which can be set according to the capabilities of the given endpoint, and consistent with protocol requirements.

The mapping data 30 can be specified to facilitate message conversion for each of the different control systems 14 and types of non-IP endpoint devices that may be implemented and reside downstream from the control apparatus 10. In this way, the endpoint connection control apparatus 10 can operate as a single connection into a network or cloud infrastructure implementing the IP messaging and presence protocol for N number of non-IP devices residing downstream (where N is a positive integer). For example, the control apparatus 10 can maintain a persistent presence within the IP messaging and presence protocol for each active non-IP endpoint. Thus by simulating the persistent presence in the IP messaging and presence protocol on behalf of such non-IP devices, legacy devices can continue to be utilized in an evolving IP-based infrastructure. As a result, duplicative systems and services that historically required local connections to each respective control system can be consolidated and implemented as services within a cloud operating in the IP messaging and presence protocol. Additionally, other client devices can send messages via the IP messaging and presence protocol to each of the non-IP devices.

By way of further example, since it possible that a given non-IP endpoint may not be operative to receive a message (e.g., due to a temporary disconnect or lack of power), the control system 14 can include a delivery control 34 and message storage 36 to control delivery of messages to non-IP endpoints. The control system 14 can receive and store messages from the endpoint connection control apparatus 10 in the message storage 36. The delivery control 34 can be programmed to access the message storage and send each message downstream periodically for delivery to the specified non-IP endpoint. For instance, the delivery control 34 can carousel the messages from the message storage 36 for repeated delivery of each message. The delivery control 34 can be implemented to provide for repeated delivery over a predetermined period of time or for a predetermined number of delivery attempts.

Additionally or alternatively, the manner of delivery can vary depending on the capabilities of the respective non-IP endpoints to which the message is sent. For instance, if a given non-IP endpoint is capable of two-way communication, the given endpoint can acknowledge receipt of the message, which acknowledgment can be utilized by the delivery control 34 to remove the message from the message storage 36.

As a further example, a non-IP endpoint device, which can communicate bi-directionally, can also be operative to send and receive non-IP messaging via the control system 14. The control system 14 can communicate such messages over the network 27 to the control system interface 26 according to an agreed upon application layer protocol (e.g., the BOSS interface). The CMA 12 can convert the message to the IP messaging and presence protocol via cooperation between the protocol adaption function 32 and the translation/business logic function 28, as disclosed herein. The CMA 12 in turn can send the message to a cloud infrastructure via the IP messaging and presence protocol for communication to one or more identified recipients.

In some examples, the endpoint connection control apparatus 10 may include other types of connection managers (not shown) to communicate IP messages from the IP messaging and presence protocol to IP-enabled devices that may also reside downstream. In this way, the endpoint connection control apparatus 10 can operate as a hybrid device supporting both non-IP endpoints as well as IP-enabled endpoints. However, the presence of the IP-enabled endpoint devices in the IP messaging and presence protocol (e.g., XMPP) are maintained by themselves and not maintained by the apparatus 10.

Figure 2:
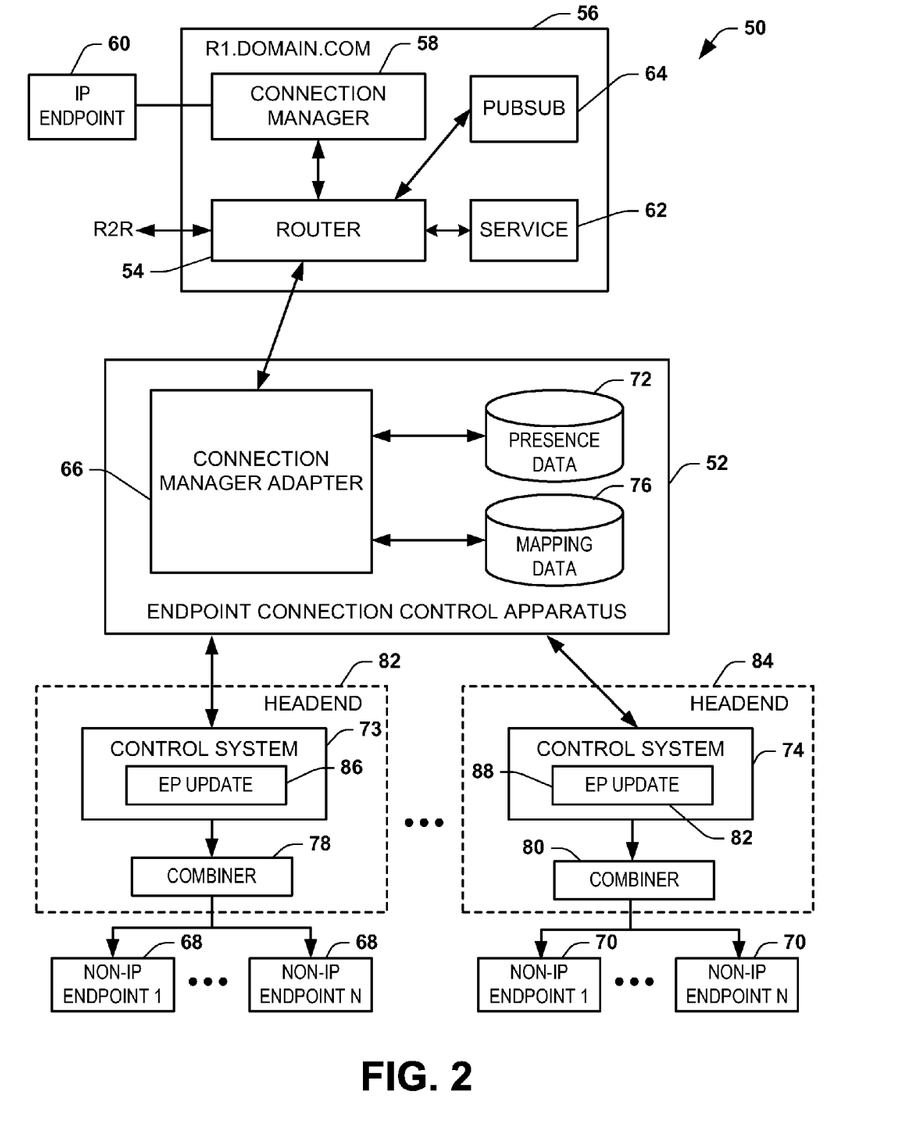
FIG. 2 depicts an example of an endpoint connection control apparatus operating within a messaging and presence protocol.

FIG. 2 depicts an example of a system 50 implementing an endpoint connection control apparatus 52. In the example of FIG. 2 the endpoint connection control apparatus 52 connects to a network through an external router 54. The router 54 forms part of a domain 56 demonstrated as R1.domain.com. The domain 56 can provide a hierarchical distributed naming system for devices, services or other resources to communicate. Thus, each IP resource operating in the domain 56 is provided a unique name for communications within the domain. The router 54 can employ a router-to-router (R2R) protocol for connecting to other routers in network, such as an intranet, a wide area network (WAN, such as the Internet) or a cloud-based infrastructure. The router-to-router protocol thus encapsulates messages being communicated in the IP messaging and presence protocol.

The domain 56 can also include one or more services 62 that can be connected with the router for accessibility by various clients and other services that may exist within the system 50. For example, the domain 56 of the router 54 can include a publish-subscribe (pub-sub) service 64 that includes any number of one or more nodes that correspond to topics. The pub-sub service 64 pushes an event notification to all entities that are authorized to learn about information that is published to the node that resides at the service 64. The other services 62 can be programmed to perform other functions.

The domain 56 also includes one or more connection managers 58 that is configured to provide connectivity to one or more IP endpoints 60. Each IP endpoint 60 can be programmed to register its presence in an IP messaging and presence protocol environment (e.g., XMPP). The IP endpoint 60, for example, may connect to the connection manager 58 through an IP connection (e.g., TCP/IP) such as may be made via a modem or other type of network interface that provides a means for communicating via the IP messaging and presence protocol that is managed by the connection manager 58. Each router in the system 50 can support any number of connection managers which may reside on the same virtual machine or on a separate machine from where the router 54 resides.

In the example of FIG. 2, the endpoint connection control apparatus 52 includes such a connection manager adapter 66, which may reside on separate virtual or physical machine from where the router is implemented. The connection manager adapter can be configured to operate as disclosed with respect to the connection manager adapter 12 of FIG. 1. The connection manager adapter 66 and router 54 communicate via an IP messaging and presence protocol. For example, the router 54 and connection manager adapter 66 can communicate via XML streaming according to the IP messaging and presence protocol. Such streaming can be bi-directional.

As disclosed herein, each of the non-IP endpoints 68 and 70 are configured as being incapable of communicating via the IP messaging and presence protocol. Examples of such devices include legacy set top boxes, cable cards or the like that may communicate via RF modulated signals. Since the non-IP endpoint 68 and 70 are not capable of implementing the protocol, the connection manager adapter 66 is programmed to maintain an active presence in the IP messaging and presence protocol for each of a plurality of non-IP endpoints 68 and 70.

The connection manager adapter 66 maintains the presence for such non-IP endpoints 68 and 70 based on presence data 72 stored in memory. The presence data 72 includes an address for each such active non-IP endpoint 68 and 70 within the IP messaging and presence protocol. The presence data 72 also includes data indicating the individual capabilities of each respective non-IP endpoint 68 and 70. The connection manager adapter 66 thus simulates each respective endpoint in the IP messaging and presence protocol based on the presence data 72. That is, the connection manager adapter 66 advertises and maintains the presence of each non-IP device based upon the presence data 72 that is stored in its associated memory instead of based on real client connections as is performed with IP-enabled endpoints (e.g., like the IP endpoints 60). Additionally, since the router 54 is implemented separate from the machine (physical or virtual) implementing the connection manager adapter 66, the router will need to also maintain session information for active sessions for non-IP endpoints 68 and 70 in the event that session recovery is required.

For example, if the router 54 sends an IP message via the IP messaging and presence protocol to a respective non-IP endpoint 68 or 70 via the IP messaging and presence protocol, the connection manager adapter 66 actually receives the message. The connection manager adapter 66 can mark the delivery of the message as being complete upon receipt according to requirements of the protocol. Outside of the IP messaging and presence protocol, however, the connection manager adapter 66 also is programmed to translate the message to a protocol-adapted format and deliver it to a control system 73 or 74 based on mapping data 76, as disclosed herein. This can be done without explicit look up for an address of the non-IP endpoint since the address in the IP messaging and presence protocol can include the MAC address for such endpoint, for example. The delivery of the protocol-adapted message to the control system 73 or 74 can occur via an IP protocol (e.g., RPC or the like) that is different from the IP messaging and presence protocol (e.g., XMPP) used to route it to the connection manager adapter 66.

The control system 73 or 74 can be programmed to send the message content (e.g., command and control instructions), based on header information in the message specifying the destination non-IP endpoint 68 or 70, via a non-IP messaging protocol to a combiner network 78 or 80. The combiner network 78 or 80 can be configured to combine control messages from the control system with broadcast content and deliver the combined information downstream as an RF modulated signal to the non-IP endpoints 67. The message content received via the IP messaging and presence protocol is thus encoded within the RF signal for delivery to the identified endpoint 68 or 70. For example, the message content can include command and control information that is sent according to the BOSS interface. Thus, while the message content can be broadcast via the combiner network and be seen by each non-IP endpoint, only the non-IP endpoint to which it was originally addressed will extract the message content and perform the encoded instructions.

In the example of FIG. 2, each control system 73 and 74 can reside or form part of a headend 82 and 84, respectively. Each headend 82 and 84 can include any number of such control systems 73 and 74. As an example, the control system 74 can correspond to DNCS commercially available from Cisco Systems, Inc. of San Jose, Calif. or similar equipment from other vendors. Thus, the connection manager adapter 66 can be programmed to translate messages between the IP messaging and presence protocol and the particular IP messaging protocol that is implemented by each respective control system 73 and 74. As mentioned above, each of the control systems 73 or 74 may be an IP-enabled system capable of communicating directly to the internet or other network.

As a further example, each control system 73 or 74 can be programmed to control broadcast cable media and control instructions to each of the respective non-IP endpoints 68 and 70 that reside downstream in the network. Such control can include managing subscription services, encryption and decryption of program content, purchasing of program content, such as pay-per-view or other content services for each of the respective endpoints.

Additionally, a given customer may have more than one endpoint device that may be capable of receiving the program content. Accordingly, a service (e.g., the service 62) can send authorization messages to each endpoint device of the customer via the IP messaging and presence protocol, including non-IP enabled endpoints 68 or 70 and IP endpoints that are associated with a given customer.

In order to maintain presence information for each of the non-IP endpoints 68 and 70, each control system 73 or 74 can include an endpoint update function 86 and 88. The endpoint update functions 86 and 88 can be programmed to send to the connection manager adapter 66 a unique identifier for each non-IP endpoint (e.g., corresponding to the MAC address of the endpoint device) as well as information identifying the type of device that is communicated. The connection manager adapter 66 can in turn generate and store such information as the presence data 72 for each such non-IP endpoint based upon the unique identifier and type information that is received from the control systems 73 and 74. The presence data thus can include an address within the domain 56 for each respective non-IP endpoint 68 and 70, such as disclosed herein (e.g., MAC_Address_of_EP@ R1.DOMAIN.COM/EC_ID, where the EC_ID corresponds to an ID of the control system 73 or 74).

As an example, the connection manager adapter 66 can generate the presence data based upon the information that is received from each control system 73 and 74. For instance, the endpoint update functions 86 and 88 can provide such endpoint information periodically. Alternatively or additionally, the endpoint update functions 86 and 88 can provide such endpoint information in response to a user input or other network updates (e.g., when consumer premises equipment is added or removed from the respective downstream network). The control systems 73 and 74 can provide such updated information to the connection manager adapter 66 via IP messaging which can vary according to the IP messaging protocol that is implemented by each respective control system (e.g., each control system can use different protocol dialects), such as can depend on the manufacturer. The connection manager thus can maintain presence information and advertise such information to the IP messaging presence protocol based upon presence data for each active non-IP endpoint that is downstream from the respective control systems 73 and 74. In the example of FIG. 2, since the connection manager adapter 66 is remote from the router 54 the router maintains presence information for each of the active sessions for the non-IP endpoints 68 or 70 such as in the event that a session recovery is necessary.

By way of further example, the control system can deliver digital broadband services to the respective non-IP endpoints 68 or 70. Such broadband delivery services can include pay-per-view and interactive programming that may be ordered in response to a user input received at a corresponding billing system from a requesting subscriber. The billing system can employ a service (e.g., the service 62) that resides on the IP messaging and presence protocol. The service 62 can correspond to a billing service that is programmed to provide corresponding authorization (e.g., command and control information) to endpoints, including the non-IP endpoints, IP endpoints or a combination thereof, via the IP messaging and presence protocol. This is in contrast to many existing systems in which the control systems 73, 74 directly receive such information from a locally connected billing system. Thus, by implementing an endpoint connection control apparatus, as disclosed herein, various billing and/or other services can be moved from a local connection into cloud-based infrastructure in which a single service can employ the IP messaging and presence protocol across a plurality of headends 82 and 84 and control systems 73 and 74 for services non-IP endpoints and IP endpoints.

Figure 3:
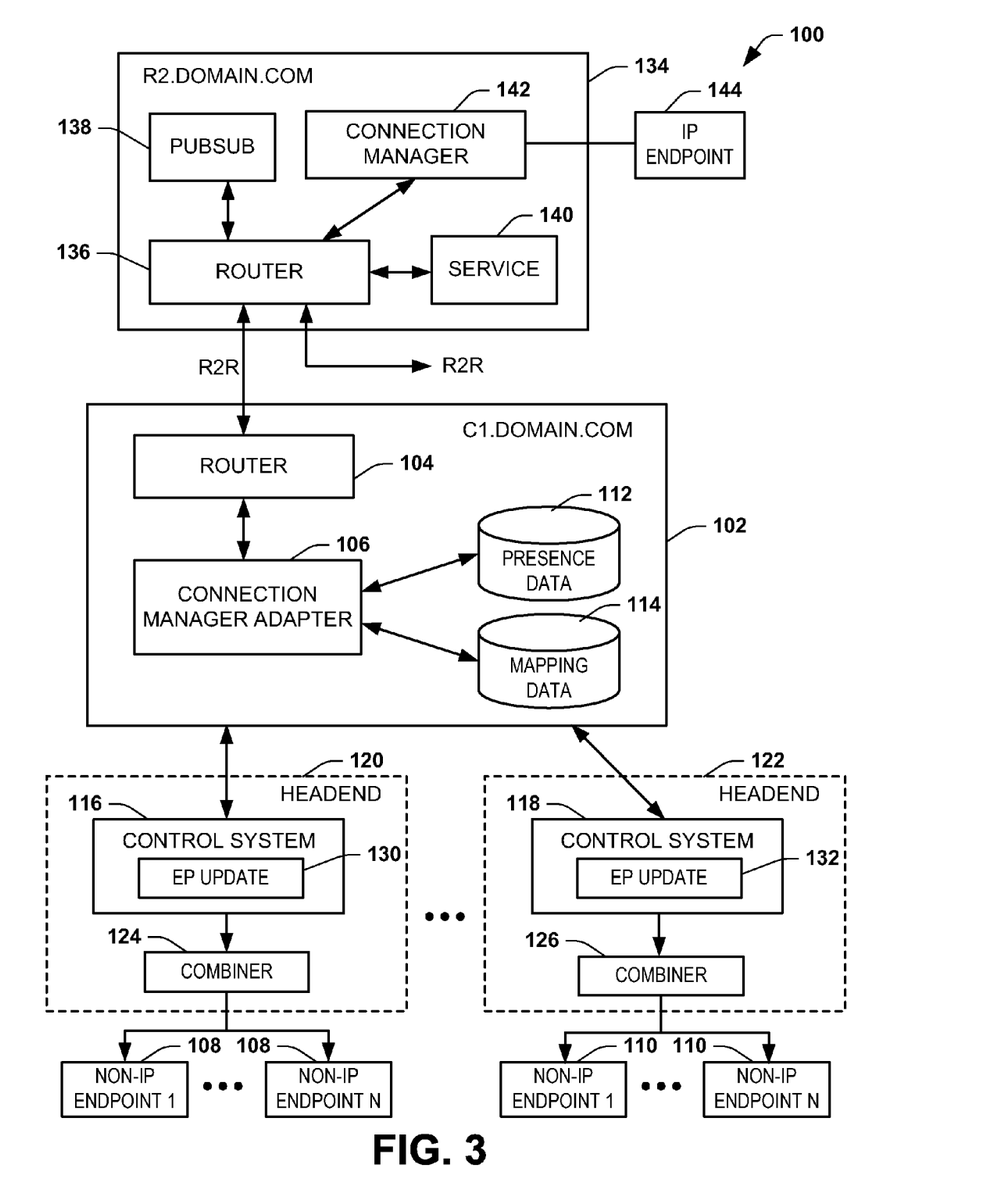
FIG. 3 depicts another example of an endpoint connection control apparatus operating within a messaging and presence protocol.

FIG. 3 depicts another example of a system 100 that can implement an endpoint connection control apparatus 102. In the example of FIG. 3, the endpoint connection and control apparatus 102 includes one or more routers 104. The endpoint connection control apparatus 102 and one or more routers 104 define a domain, demonstrated as C1.domain.com. That is, the endpoint connection control apparatus 102 can be implemented as a router to control forwarding IP data packets using a router-to-router protocol. In this example, the router 104 is not external to the endpoint connection control apparatus 102, as in the example of FIG. 2, but resides within the endpoint connection control apparatus. Thus, in the system 100, the endpoint connection control apparatus 102 can connect to the messaging and presence infrastructure as a "server/member" in the role of a router. Additionally, since the endpoint connection control apparatus 102 operates as a router, the session information associated with the plurality of non-IP endpoints does not need to be stored in memory separate from the endpoint connection control apparatus 102. This integrated router example also affords improved scalability of the endpoint connection control apparatus 102.

For example, as additional endpoints or control systems are added to the system 100 and additional routing capacity is needed, additional routers can be connected into the same domain, corresponding to the domain of the endpoint connection control apparatus 102. Each router that is added to the domain of the endpoint connection control apparatus 102 can communicate with each other via router-to-router protocol within the domain. Each router in the domain of the endpoint connection control apparatus 102 can communicate via the IP messaging and presence protocol with a respective connection manager adapter 106. There can be one or more instances of the connection manager adapter in the endpoint connection control apparatus 102. In this example, a single connection manager adapter 106 is illustrated.

The connection manager adapter 106 operates to simulate the presence of a plurality of non-IP endpoints 108 and 110 that reside downstream from the endpoint connection and control apparatus 102. The connection manager adapter is programmed to advertise and maintain an active presence in the IP messaging and presence protocol for each of a plurality of non-IP endpoints 108 and 110 that reside downstream based on presence data 112 stored in memory, as disclosed herein (e.g., see descriptions of CMA 12 and 66 of FIGS. 1 and 2). Additionally, the connection manager adapter 106 is also programmed to translate the messages between the IP messaging and presence protocol and another protocol, which is different, based on mapping data 114 also stored in memory. The different protocol can correspond to a predetermine IP messaging protocol utilized by a control system 116 or 118. The connection manager adapter 106 can also implement business rules to control routing of the messages to the designated recipient and in the proper format as disclosed herein (see, e.g., FIG. 1). Additional information about the operation of the endpoint connection control apparatus 102 and connection manager adapter 106 can be obtained with reference back to the example of FIG. 1. The operation of the control systems and other parts of each head end 120 and 122 in which each control system operates can be implemented as disclosed with respect to FIG. 2.

Briefly stated, each control system 116 and 118 can receive protocol-adapted messages in its native protocol. Each control system 116 and 118 can send the messages downstream to a respective combiner network 124 and 126 via non-IP messaging. The combiner networks 124 and 126 can combine the messages with other broadcast content that can be sent to the non-IP endpoints 108 and 110 via RF modulation (e.g., QAM, QPSK and the like), such as disclosed herein.

Each control system 116 and 118 can include an endpoint update function 130 and 132 that provides information (e.g., including a MAC address and device type) for each of the non-IP endpoints 108 and 110 to the connection manager adapter 106. The connection manager adapter 106 can generate and store presence information as the presence data 112 for each non-IP endpoint based upon information provided by the EP update function 130 and 132, such as disclosed herein.

Similar to as described in the example of FIG. 2, there can be any number of domains in the system 100 for the endpoint connection and control apparatus. One such other domain (R2.domain.com) 134 is illustrated in the example of FIG. 3. The domain 134 can include a router 136 that can employ a router-to-router (R2R) protocol for connecting to other routers in system (e.g., a LAN, WAN or cloud-based infrastructure). The domain 134 can also include a pub-sub service 138 and one or more other services 140, which may be internal services or external services that connect via a connection manager, such as disclosed herein. The domain 134 can also include one or more connection managers 142 configured to provide connectivity with one or more IP endpoints 60 in the IP messaging and presence protocol (e.g., XMPP), such as disclosed herein.

As disclosed herein, entitlement or billing services (e.g., corresponding to the service 140) can ubiquitously use the same messaging mechanism via the IP messaging and presence protocol (e.g., XMPP) to implement command and control for both IP-based endpoints 144 and non-IP based endpoints 108 and 110. Additionally, since the unique presence identifier utilized can be programmed to include the MAC address for each respective endpoint device a unique identifier for a corresponding control system, messages can be routed efficiently without explicit look up to memory and software. Hence, translation from the IP messaging presence and protocol to the protocol-adapted message for delivery to the non-IP endpoints can be facilitated.

Figure 4:
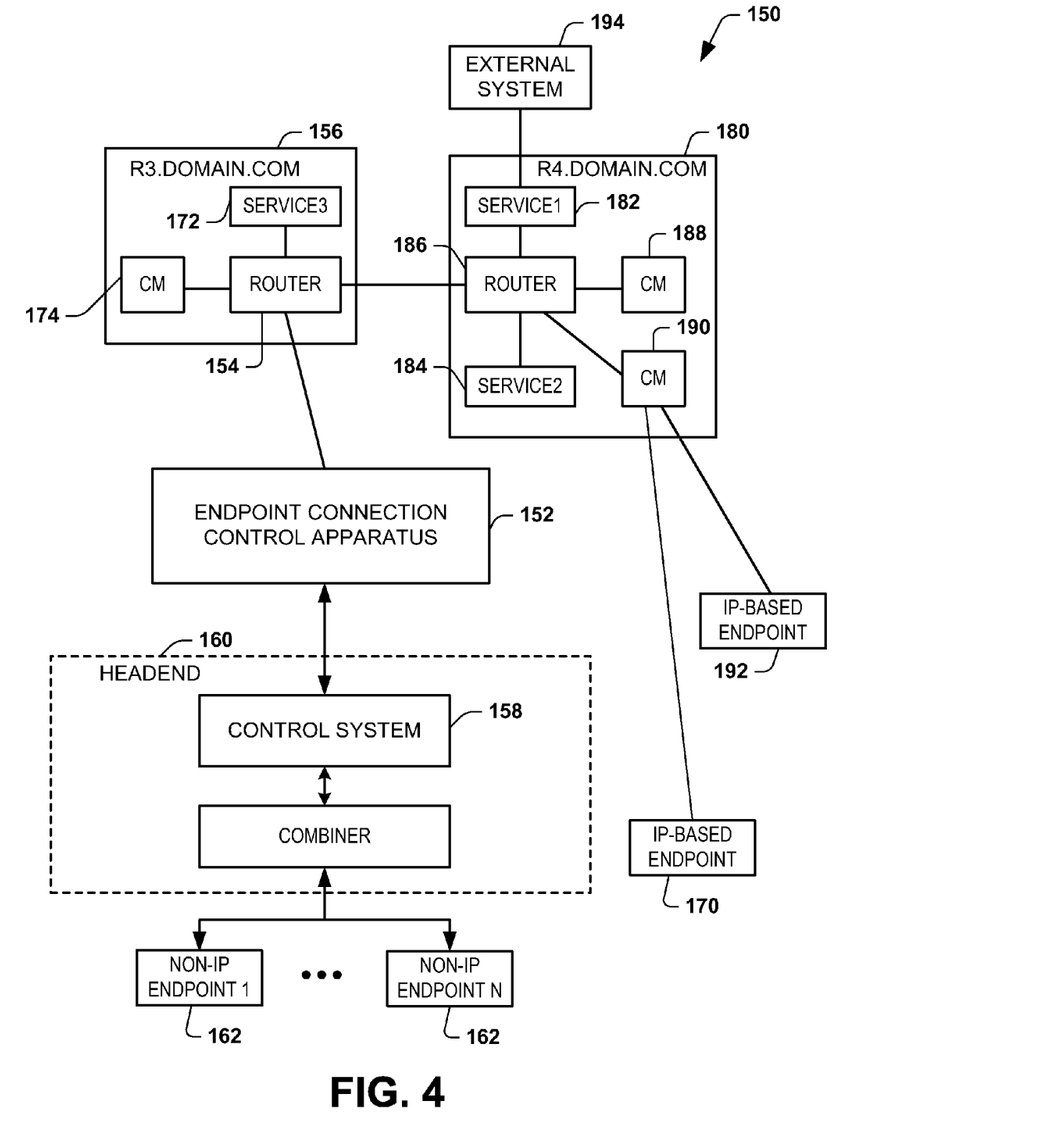
FIG. 4 depicts an example of a system utilizing an endpoint connection control apparatus in a messaging infrastructure.

By way of further example, FIG. 4 depicts another example of an integrated broadband delivery system 150 that includes an endpoint connection control apparatus 152. By this arrangement, efficiencies in the delivery and control of broadband television services can be realized. For instance, the integrated system 150, which includes the endpoint connection control apparatus 152, enables non-IP and IP clients to co-exist within a single command and control plane. In the example of FIG. 4, the endpoint connection and control apparatus 152 can be implemented similar to as shown in the examples of FIGS. 1-3. Thus, the endpoint connection control apparatus 152 may include a router internally implemented therein as part of the apparatus (e.g., as disclosed in the example of FIG. 3) or, alternatively may be remotely located from an external router such as the router 154 in another domain 156 (e.g., as disclosed in the example of FIG. 2).

The endpoint connection and control apparatus 152 can be coupled to one or more control systems 158. The control apparatus 152 can be implemented as part of a headend 160 that is connected to a plurality of downstream non-IP endpoints 162, demonstrated as non-IP endpoint 1 through N, where N is a positive integer. In addition to controlling authorization and delivery of services for each of the endpoints 162, the control system 158 also is programmed to provide the endpoint connection control apparatus 152 presence related information, corresponding to identification and capabilities, for each of the non-IP endpoints 162.

As disclosed herein, the endpoint connection control apparatus 152 can store endpoint presence data to maintain a presence in an IP messaging presence protocol (e.g., XMPP) for each of the non-IP endpoints based upon the presence data that is stored in memory. Such presence information for active sessions can be communicated to the IP messaging and presence protocol registrar to enable messaging to the endpoint connection control apparatus 152, which simulates the presence of each endpoint in the protocol.

In the example of FIG. 4, the domain 156 can include one or more services (e.g., service 3) 172 and one or more connection managers (CM) 174. As disclosed herein, a system can include any number of domains including domain (R4.domain.com) 180. The domain 180 is demonstrated as including multiple services 182 and 184 that are connected with a corresponding router 186. The router 186 can communicate with router 154 using a router-to-router protocol, for example. The router 186 can include one or more connection managers 188 and 190 configured for providing IP connectivity (e.g., using TCPI/IP) to one or more IP-based endpoints 170 and 192. Each of the IP-based endpoints 170 and 192 is programmed to operate in the IP messaging and presence protocol environment. For instance, each endpoint 170 and 190 can advertise its own presence via the IP messaging and presence protocol. Additionally, in the example system 150, the messaging and presence command and control layer of domains 156 and/or 180 can control each IP-based endpoint 170 and 192.

In the following example, it is presumed that the IP-based endpoint 192 and at least one of the non-IP endpoints 162 are associated with a common customer. They may be co-located or at different geographic locations, and the IP-based endpoint 192 may be mobile. As an example, the IP-based endpoint 192 can be implemented on a PC, smart phone, tablet PC or the like and is registered in the IP messaging and presence protocol implemented in the system 150. For example, the IP-based endpoint can be associated with a common customer ID as one or more of the other endpoints for a given customer, corresponding to different devices via which the customer can receive programming content.

A user can utilize the IP-based endpoint 192 to provide a user input request for new services or modify existing entitlements for services. Alternatively, the request can be made via a non-IP endpoint, such as via a user interface (e.g., an electronic program guide) on a set top box. The request can be routed to a service, demonstrated as service 182, such as corresponding to a billing service within the domain 180. The billing service 182 can employ an external system 194 such as an external billing system that can provide customer account information associated with the request received from the IP-based endpoint 192. The external system 194 can be coupled directly to the service 182, for example, and be programmed to authorize and respond to the request from the user. The external system 194 can perform a client directory look-up via a corresponding directory service (e.g., part of the system or another service in the system 150) such that the request can be associated with each endpoint that is registered to the user-customer.

The billing system 194 can also look-up client directory information to identify customer account related to the legacy CPE should the request come from a non-IP endpoint 162. The external billing system 194 can in turn update the subscription data for such customer in response to the user input request. Once the subscription catalog data has been updated, an entitlement service (e.g., corresponding to the service 172 in the domain 156) can generate corresponding entitlement messages that are transmitted to each of the corresponding endpoints for the customer. For instance, the entitlement messages can include command and control information to authorize the customer's endpoints, including both non-IP endpoints 162 or as well as IP-based endpoints 170 and 192, to receive the requested services. The entitlement messages can be routed from the entitlement service 172 to each of the endpoints via the IP messaging and presence protocol as disclosed herein. In response to the messages, each endpoint device associated with this account can then receive the requested media content.

Figure 5:
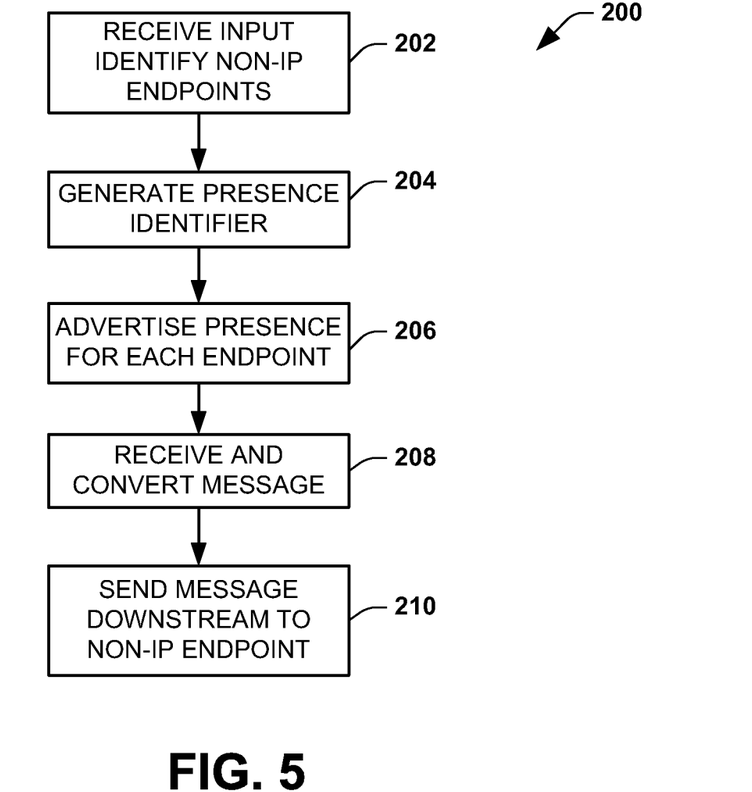
FIG. 5 is a flow diagram depicting an example of a method of enabling a non-IP device to participate in an IP-based messaging and presence infrastructure.

In view of the foregoing structural and functional features described above, an example method will be better appreciated with reference to FIG. 5. While, for purposes of simplicity of explanation, the method is shown and described as executing serially, it is to be understood and appreciated that such method is not limited by the illustrated order, as parts of the method could occur in different orders and/or concurrently from that shown and described herein. Such method or portions thereof can be implemented as instructions stored in a non-transitory storage media as well as be executed by a processor of a computer, for example.

FIG. 5 illustrates an example of a method 200 for enabling a non-IP endpoint to operate in an IP messaging and presence protocol (e.g., XMPP). The method 200 begins at 202 in which an input identifying each of a plurality of downstream endpoints is received (e.g., at an endpoint connection control apparatus 10, 52 or 102). The input can also identify capabilities and features for each of the plurality of endpoints. As an example, the input can include a unique identifier for each of the plurality of non-IP endpoints, such as including a MAC address.

At 204, a corresponding presence identifier for each of the plurality of non-IP endpoints can be generated (e.g., by connection manager adapter 12, 66 or 106). The presence identifier can be stored as part of presence data (e.g., presence data 18, 72 or 112) in memory. For instance, the presence identifier and capability information can be generated based on the unique identifier for each endpoint and the information identifying the capabilities received at 202.

At 206, each of the non-IP endpoints can be advertised to the IP messaging and presence protocol. As disclosed herein, the advertising can be performed based on the presence data that is stored in memory for each of the plurality of endpoints, which can include the unique identifier and capability information. The advertising of presence identifier and capability information can be utilized for registering each of the plurality of endpoints within the protocol. The advertising can be implemented to dynamically add or remove an endpoint's presence from the IP messaging and presence infrastructure, such as in response to adding or removing non-IP endpoints at a customer premises.

The presence identifier can be implemented as a construct having dual purposes. For example, the presence identifier can uniquely identify each non-IP endpoint in the IP messaging and presence protocol (e.g., corresponding to JID). The presence identifier can also be con ng and presence protocol for sending message content between the protocol and structed as to include routing information that can be utilized outside of the IP messagi each non-IP endpoint, as disclosed herein. The construct thus can be utilized to facilitate the routing and conversion of the message to other protocols and formats outside of the IP messaging and presence protocol, which conversion can be performed without requiring explicit look-up of the control system and the corresponding downstream endpoints. The presence identifiers that are registered in the IP messaging and presence protocol thus can be utilized to communicate messages to, and in some cases from, each of the plurality of non-IP endpoints.

Once the presence of a non-IP endpoint has been advertised in the IP messaging and presence protocol, at 208, a message that is received via the IP messaging and presence protocol can be converted (e.g., by connection manager adapter 12, 66 or 106) to a protocol-adapted message and be packaged in a format for delivery to a non-IP endpoint. The conversion and packaging of the message can be performed based on mapping data as disclosed herein. The protocol-adapted message can be sent downstream, such as to a control system. The protocol-adapted message, for example, can be communicated via an IP-based protocol different from the IP messaging and presence protocol. The control system can in turn send the message downstream via non-IP signaling, which can be subsequently RF modulated for delivery to the non-IP endpoint (e.g., a set top box, cable card or the like).

What have been described above are examples. It is, of course, not possible to describe every conceivable combination of components or methods, but one of ordinary skill in the art will recognize that many further combinations and permutations are possible. Accordingly, the invention is intended to embrace all such alterations, modifications, and variations that fall within the scope of this application, including the appended claims.

Where the disclosure or claims recite "a," "an," "a first," or "another" element, or the equivalent thereof, it should be interpreted to include one or more than one such element, neither requiring nor excluding two or more such elements. As used herein, the term "includes" means includes but not limited to, the term "including" means including but not limited to. The term "based on" means based at least in part on.

What is claimed is:

1. An apparatus comprising:
   a connection manager adapter configured to maintain a unique addressing identity for each of a plurality of non-internet protocol (IP) endpoints in an IP messaging and presence protocol based on endpoint presence data, the endpoint presence data including a unique identifier and attribute data received for each of the plurality of non-IP endpoints, the connection manager adapter configured to convert a message that includes the addressing identity of a given non-IP endpoint of the plurality of non-IP endpoints from the IP messaging and presence protocol to a different protocol to enable for communication of at least a portion of the message to the given non-IP endpoint using a non-IP protocol.

2. The apparatus of claim 1, wherein the apparatus comprises a router that defines a domain in the IP messaging and presence protocol for the connection manager adapter and each of the plurality of non-IP endpoints that reside downstream from the connection manager adapter, the router communicating with a network via a router-to-router protocol that encapsulates the IP messaging and presence protocol.

3. The apparatus of claim 1, wherein the connection manager adapter is programmed to communicate with an external router, each of the plurality of non-IP endpoints residing on the same domain as the external router.

4. The apparatus of claim 1, wherein the endpoint presence data comprises a presence identifier that uniquely identifies each of the plurality of non-IP endpoints in the IP messaging and presence protocol, the presence identifier for each respective non-IP endpoint comprising:
   a domain in which the respective non-IP endpoint resides;
   a controller identifier of a control system in the domain from which the respective non-IP endpoint resides downstream; and
   the unique identifier for the respective non-IP endpoint.

5. An apparatus comprising:
   a connection manager adapter configured to maintain presence for each of a plurality of non-internet protocol (IP) endpoints in an IP messaging and presence protocol based on endpoint presence data, the endpoint presence data including a unique identifier and attribute data received for each of the plurality of non-IP endpoints, the connection manager adapter configured to convert a message between the IP messaging and presence protocol and a different protocol for communication with a given non-IP endpoint of the plurality of non-IP endpoints; and
   an advertisement function programmed to advertise and maintain an active presence in the messaging and presence protocol, based on the endpoint presence data, for each active non-IP endpoint that is downstream from the connection manager adapter.

6. The apparatus of claim 5, wherein the advertisement function is programmed to advertise capabilities based on the attribute data stored in memory for each of the plurality of non-IP endpoints, the attribute data specifying a type of device corresponding to each of the plurality of non-IP endpoints.

7. The apparatus of claim 6, wherein connection manager is programmed to generate a unique presence identifier for each of the plurality of non-IP endpoints in the IP messaging and presence protocol based on the unique identifier for each respective non-IP endpoint, the presence identifier for each of the plurality of non-IP endpoints being stored in the memory in the endpoint presence data.

8. The apparatus of claim 7, wherein the presence identifier for each respective non-IP endpoint routing information that comprises:
   an endpoint identifier for uniquely identifying the respective non-IP endpoint;
   a resource identifier for a control system with which the respective non-IP endpoint communicates, the control system residing between the connection manager adapter and the respective non-IP endpoint; and
   a domain in the messaging and presence protocol within which the respective non-IP endpoint resides.

9. The apparatus of claim 1, further comprising mapping data stored in memory, the connection manager adapter further comprising a translator programmed to process a given message received via the IP messaging and presence protocol and prepare the received given message for delivery to the given non-IP endpoint based a presence identifier in the received message and based on the mapping data.

10. The apparatus of claim 9, wherein the connection manager adapter further comprises a protocol adapter programmed to convert the prepared message from the translator to a protocol-adapted message based on the mapping data stored in the memory, the protocol-adapted message having a format to enable delivery downstream to the given non-IP endpoint via a control system.

11. The apparatus of claim 10, wherein the protocol-adapted message is communicated as a predefined radio frequency (RF) signal, the translator being configured to translate an IP-based message received via the IP messaging and presence protocol to the RF signal based on mapping data stored in memory.

12. The apparatus of claim 1, further comprising a second connection manager programmed to route an IP message to or from a corresponding IP-based endpoint residing downstream relative to the apparatus.

13. The apparatus of claim 1, wherein each of the plurality of non-IP endpoints comprises one of a set top box and a cable card that communicates via a non-IP radio frequency network.

14. The apparatus of claim 1, wherein the connection manager adapter provides a single connection to a cloud infrastructure that enables each of the plurality of non-IP endpoints to participate in the IP messaging and presence protocol.

15. A non-transitory computer readable medium storing machine readable instructions comprising:
   an advertisement function programmed to advertise and maintain an active presence in an IP messaging and presence protocol for each of a plurality of non-IP endpoints based on endpoint presence data stored in memory, the endpoint presence data including a presence identifier to uniquely identify each of the plurality of non-IP endpoints in the IP messaging and presence protocol;
   a translation/logic function programmed to receive and process a message, based the presence identifier in the message received via the IP messaging and presence protocol, and prepare the received message for delivery to a given non-IP endpoint; and a protocol adapter programmed to convert the prepared message from the translation/logic function to a protocol-adapted message based on mapping data stored in the memory, the protocol-adapted message having a format to enable delivery downstream to the given non-IP endpoint via a control system.

16. The medium of claim 15, wherein the machine readable instructions further comprise a router interface programmed to communicate with the IP messaging and presence protocol, the router interface residing in one of a machine executing the machine readable instructions or being external to the machine executing the machine readable instructions.

17. The medium of claim 15, wherein the presence identifier for each respective non-IP endpoint comprises routing information specifying:
  a domain in which the respective non-IP endpoint resides;
  a resource identifier of an associated control system in the domain from which the respective non-IP endpoint resides downstream; and
  a unique identifier for the respective non-IP endpoint.

18. The medium of claim 17, wherein the protocol adapter being programmed to provide the protocol-adapted message according to more than protocol for delivery to a given non-IP endpoint based on the mapping data stored in the memory and the control system specified by the resource identifier in the presence identifier.

19. The medium of claim 15, wherein the translation/logic function is further programmed to convert a device level entitlement for the given non-IP endpoint to an account level entitlement based on the mapping data.

20. A method comprising:
  receiving an input that identifies each of a plurality of non-IP endpoints and capabilities for each of the plurality of non-IP endpoints;
  generating a presence identifier for each of the plurality of non-IP endpoints based on the received input;
  storing presence data in memory corresponding to the presence identifier and capabilities for each of the plurality of non-IP endpoints;
  advertising a presence for each of the non-IP endpoints in an internet protocol (IP) messaging and presence protocol based on the presence data;
  receiving a message via the IP messaging and presence protocol, the received message including a presence identifier for a given non-IP endpoint of the plurality of non-IP endpoints; and
  adapting the received message from IP messaging and presence protocol to a predefined protocol and format to enable downstream delivery of a protocol-adapted message to the given non-IP endpoint.

21. The method of claim 20, wherein the IP messaging and presence protocol is an Extensible Messaging and Presence Protocol (XMPP), the advertised presence identifier being operative to register each of the plurality of non-IP endpoints within the XMPP.

22. The method of claim 20, wherein the input that identifies each of a plurality of non-IP endpoints identifier received for each respective non-IP endpoint further comprises one of a media access control (MAC) address for the respective non-IP endpoint, a serial number of the respective endpoint or an IP address for the respective non-IP endpoint.

23. The method of claim 20, wherein the presence identifier for each respective non-IP endpoint comprises data specifying:
  a router domain in which the respective non-IP endpoint resides;
  a controller identifier of a control system in the router domain from which the respective non-IP endpoint resides downstream; and
  a unique identifier for the respective non-IP endpoint.

24. The method of claim 20, wherein the adapting further comprises:
  preparing the received message, based the presence identifier in the received message, to enable the downstream delivery to the given non-IP endpoint; and
  converting the prepared message to the protocol-adapted message based on mapping data stored in the memory, the protocol-adapted message having a predetermined format to enable delivery downstream to the given non-IP endpoint via a control system that resides outside of the IP messaging and presence protocol and upstream of the plurality of non-IP endpoints.

25. The method of claim 20, further comprising:
  storing the protocol-adapted message in the control system; and
  repeatedly delivering the stored message from the control system to the given non-IP endpoint.

26. The method of claim 20, wherein at least the given non-IP endpoint comprise a set top box or a cable card, the method further comprising receiving from a cloud infrastructure an entitlement message via the IP messaging and presence protocol, the entitlement message including information to control entitlements of the given non-IP endpoint to services received via a radio frequency network.

27. The method of claim 26, wherein the given non-IP endpoint is associated with a corresponding account, the method further comprising:
  converting a device level entitlement for the given non-IP endpoint to an account level entitlement; and
  routing the account level entitlement from the cloud infrastructure to both non-IP and IP endpoints associated with the corresponding account.

* * * * *